US011970362B2

(12) United States Patent
Liebetrau

(10) Patent No.: US 11,970,362 B2
(45) Date of Patent: Apr. 30, 2024

(54) FASTENING APPARATUS FOR FASTENING A DRIVE OF AN ELEVATOR SYSTEM

(71) Applicant: Inventio AG, Hergiswil (CH)

(72) Inventor: Christoph Liebetrau, Menziken (CH)

(73) Assignee: INVENTIO AG, Hergiswil (CH)

( * ) Notice: Subject to any disclaimer, the term of this patent is extended or adjusted under 35 U.S.C. 154(b) by 35 days.

(21) Appl. No.: 17/907,283

(22) PCT Filed: Mar. 30, 2021

(86) PCT No.: PCT/EP2021/058340

§ 371 (c)(1),
(2) Date: Sep. 26, 2022

(87) PCT Pub. No.: WO2021/198282

PCT Pub. Date: Oct. 7, 2021

(65) Prior Publication Data

US 2023/0111475 A1 Apr. 13, 2023

(30) Foreign Application Priority Data

Mar. 30, 2020 (EP) .................................... 20166665

(51) Int. Cl.
*B66B 11/00* (2006.01)

(52) U.S. Cl.
CPC .................................. *B66B 11/004* (2013.01)

(58) Field of Classification Search
CPC ..................................................... B66B 11/004
USPC ......................................... 187/256, 254, 266
See application file for complete search history.

(56) References Cited

U.S. PATENT DOCUMENTS 6,446,762 B1 * 9/2002 St. Pierre ................ B66B 7/024 187/408
7,377,366 B2 * 5/2008 Det ..................... B66B 11/0045 187/256
8,522,927 B2 * 9/2013 Fischer ................ B66B 11/043 187/254

FOREIGN PATENT DOCUMENTS

| | | | |
|---|---|---|---|
| EP | 2493803 | B1 | 1/2018 |
| JP | S5847784 | A | 3/1983 |
| JP | 2001106461 | A | 4/2001 |
| JP | 2008168986 | A | 7/2008 |
| KR | 101993549 | B1 | 9/2019 |

* cited by examiner

*Primary Examiner* — Todd M Epps
(74) *Attorney, Agent, or Firm* — William J. Clemens; Shumaker, Loop & Kendrick, LLP

(57) ABSTRACT

A fastening apparatus for fastening a drive of an elevator system, wherein the elevator system includes an installation structure for installing the drive, has a beam with two feet for fastening the beam to the installation structure. The fastening apparatus includes a drive bracket for receiving the drive, wherein the drive bracket is fastened to the beam, and a support leg that is fastened at one end to the drive bracket and additionally supports the drive bracket on the installation structure.

13 Claims, 6 Drawing Sheets

FASTENING APPARATUS FOR FASTENING A DRIVE OF AN ELEVATOR SYSTEM

FIELD

The present invention relates to a fastening apparatus for fastening a drive of an elevator system. The invention further relates to an elevator system having such a fastening apparatus.

BACKGROUND

An elevator system, such as a passenger or freight elevator, usually comprises a machine room in which a drive, a controller, and a speed limiter of the elevator system can be located. The machine room can be arranged, for example, above an elevator shaft, next to the elevator shaft, or below the elevator shaft.

The drive serves to move an elevator car in the elevator shaft. The elevator car can be coupled to the drive via a suitable support means such as ropes, belts, or straps. The drive can, for example, comprise a traction sheave for moving the ropes, belts, or straps and an electric motor for driving the traction sheave. The support means can be guided through openings in a floor of the machine room, for example.

The installation of the drive usually takes place in the machine room using a suitable fastening apparatus, such as a support structure that is specially adapted to the conditions in the corresponding machine room. In order to keep the effort involved in installing the drive and producing such a fastening apparatus low, it would be desirable if the drive could be fastened to existing installation structures in the machine room without complex adjustments to the fastening apparatus.

EP 2 493 803 B1, for example, describes a fastening apparatus having two support structures which are fastened to a base plate and are adjustable in the longitudinal direction of the base plate. The drive can be fastened to the support structures in an inclined position.

KR 101993549 B1, for example, describes an elevator system that comprises a drive machine, a wedge-shaped drive machine bed that is arranged on an underside of the drive machine, and a likewise wedge-shaped drive machine support. In this case, an inclined surface of the drive machine bed can slide along an inclined surface of the drive machine support. The drive machine bed can be fixed in a plurality of positions on the drive machine support.

SUMMARY

Among other things, there can be a need to simplify the installation of a drive of an elevator system.

Such a need can be met by a fastening apparatus and an elevator system according to the advantageous embodiments defined in the following description.

A first aspect of the invention relates to a fastening apparatus for fastening a drive of an elevator system. The elevator system comprises an installation structure for installing the drive. The elevator system can be a passenger elevator or freight elevator, for example. The drive can comprise, for example, a traction sheave and an electric motor. The traction sheave can be seated on a drive shaft of the electric motor. Alternatively, the traction sheave can be coupled to the drive shaft of the electric motor via a gear. The installation structure can comprise, for example, a base plate and at least one installation support. The installation structure can be arranged in a machine room of the elevator system, for example on the floor, ceiling, or side wall thereof.

The fastening apparatus comprises a beam having two feet for fastening the beam to the installation structure, a drive bracket for receiving the drive, wherein the drive bracket is fastened to the beam, and a support leg which is fastened at one end to the drive bracket and is designed to additionally support the drive bracket on the installation structure.

A beam can be understood to mean an elongate support structure. For example, the beam can be constructed from a plurality of individual parts such as profiles or plates. The individual parts can be welded to one another, for example, resulting in a rigid yet lightweight construction. Alternatively or additionally, the individual parts can be screwed together or otherwise connected to one another in a reversible or irreversible and mechanically loaded manner. The beam can be designed to support a main portion of the forces acting on the fastening apparatus.

The two feet can be understood as supports of the beam. The feet can each have a certain height to prevent portions of the beam located between the feet from touching the installation structure, such as a base plate on which the drive is to be fastened.

The drive bracket can be screwed to the beam, for example. Thus, the fastening apparatus can be easily disassembled. The drive bracket can be displaceable, for example, in the longitudinal direction of the beam. For example, the drive bracket can slide along longitudinal edges of the beam. Accordingly, the drive bracket can be fastened in different positions in the longitudinal direction of the beam. For example, for this purpose, the beam can have a plurality of screw receptacles distributed in the longitudinal direction of the beam.

Like the beam, the drive bracket can be constructed from individual profiles or plates, for example, which can be welded and/or screwed together. The drive bracket serves to place the drive, in particular the traction sheave, at a specific height and in a specific orientation relative to the beam.

A support leg can be understood to mean an elongate, in particular rod-shaped element. The support leg can be fastened to the drive bracket in a rigid or articulated manner. For example, the support leg can be screwed to the drive bracket. For example, the drive bracket can have a plurality of fastening positions for fastening the support leg in different positions or orientations. The support leg can be designed to support some of the forces acting on the drive bracket. For example, the support leg can be designed with a significantly smaller cross section than the beam, i.e., for example with a cross section smaller by more than 10%, preferably by more than 30%, or even more than 50%.

For example, the drive bracket and beam can be preassembled as separate assemblies.

When assembling the fastening apparatus, the beam can first be fastened to the installation structure. The drive bracket can then be placed on the beam and/or inserted into the beam and fastened thereto. The drive bracket can be pre-assembled with the drive as a unit. However, it is also possible for the drive to be installed on the beam only after the fastening of the drive bracket. Finally, the support leg can be adjusted and/or fastened.

Thus, the fastening apparatus can be installed in just a few steps. In particular, the drive can be fastened to different installation structures with only minor adjustments to the fastening apparatus. Thus, the installation time can be shortened and the manufacturing cost can be reduced.

Due to the fact that the drive is mounted on three defined points, i.e., the two feet and the support leg, a stable mounting of the drive can also be ensured.

A second aspect of the invention relates to an elevator system that comprises a drive, an installation structure for installing the drive, and a fastening apparatus, as described above and below. The drive is fastened to the installation structure by means of the fastening apparatus.

In addition, the fastening apparatus can comprise at least one deflection roller which is rotatably mounted on the beam.

The elevator system can comprise an elevator shaft and an elevator car that can be moved in the elevator shaft. The elevator car can be coupled to the drive of the elevator system with a suitable support means. The support means can be guided through one or more openings in a floor, a ceiling, or a side wall of a machine room and/or the elevator shaft for the drive.

Possible features and advantages of embodiments of the invention can be considered, inter alia and without limiting the invention, to be based upon the concepts and findings described below.

According to one embodiment, the support leg is adjustable in length.

According to one embodiment, the support leg comprises two or more elements which can be displaced relative to one another and which can be displaced telescopically into one another and latched, whereby the support leg is adjustable in length.

This makes it possible for the fastening apparatus to be easily adapted, i.e., in particular with little expenditure of time and without special tools, to various conditions in the elevator system even after manufacture and thus to be used in a large number of different elevator systems. This makes it possible to use one fastening apparatus for a large number of different elevator systems.

For example, the support leg can be designed with two or more rod-shaped elements that can be displaced relative to one another. For example, the rod-shaped elements can be displaced telescopically into one another. Thus, an easy adjustment of the support leg to different distances between the drive bracket and the installation structure is possible.

According to one embodiment, the support leg has a support foot at another end, wherein the support foot rests flat on the installation structure when the fastening apparatus is in the installed state.

The support foot can, for example, be mounted pivotably on the support leg. Alternatively or additionally, the support foot can be fastened, for example screwed, to the support leg in different positions and/or orientations. The support foot can also be rigidly fastened to the support leg. For example, the underside of the support foot can have a special covering made of a vibration-damping and/or friction-reducing material, such as an elastomer or some other plastics material.

Thus, a permanently stable support of the drive bracket can be ensured.

According to one embodiment, the beam comprises two parallel support plates which are connected to one another via at least one connecting plate, wherein the feet are fastened to the at least one connecting plate and the drive bracket is fastened to the support plates.

For example, the beam can have two or more connecting webs as connecting plates, which webs connect the support plates to one another on their underside. The support plates and the connecting plate can be connected to one another in a materially bonded manner, for example by welding or another suitable joining method. The support plates can be arranged opposite one another at a specific distance from one another. In this case, the support plates can be oriented substantially perpendicularly to the connecting plate.

Thus, the beam can be easily manufactured. In addition, a high rigidity of the beam can be achieved without the beam becoming too heavy.

According to one embodiment, each of the feet is formed by a plate assembly made up of the at least one connecting plate and a fastening plate for fastening the beam to the installation structure.

Thus, the feet can be made with little effort. The feet can also be designed to be very robust.

The connecting plate and the fastening plate can, for example, be screwed and/or welded to one another. A screw connection makes it possible to easily replace the fastening plate, for example with a fastening plate of a different thickness, length, or width.

According to one embodiment, the fastening plate is wider than the at least one connecting plate and protrudes beyond the at least one connecting plate on both sides.

The beam can thus be fastened to the installation structure so that it is stable against tipping.

According to one embodiment, the plate assembly also comprises at least one intermediate element which is arranged between the fastening plate and the at least one connecting plate. The at least one connecting plate rests on the at least one intermediate element.

The intermediate element can be, for example, another plate, a block, or a disc. The fastening plate can be arranged at a specific vertical distance from the connecting plate by means of the intermediate element.

According to one embodiment, the plate assembly further comprises a first intermediate element and a second intermediate element. The first intermediate element and the second intermediate element are arranged next to one another between the fastening plate and the at least one connecting plate. The at least one connecting plate rests on the first intermediate element and the second intermediate element.

Depending on the length of the connecting plate or the fastening plate, the two intermediate elements can be arranged next to one another at a specific distance. For example, the two intermediate elements can be arranged one behind the other transversely to a longitudinal direction of the beam.

According to one embodiment, the support plates each have an axle receptacle for receiving an axle of a deflection roller.

An axle receptacle can be a bore in a support plate, for example.

The deflection roller can thus be arranged between the two support plates with little effort.

According to one embodiment, the support plates each have an installation portion for installing a deflection roller bracket in a suspended manner.

The installation portion can comprise, for example, one or more bores for receiving screws or pins.

A deflection roller bracket can be understood as a bearing housing for rotatably supporting a deflection roller. The deflection roller bracket can be installed together with the deflection roller as a unit on the support plates. In the installed state, the deflection roller bracket is located mostly below the beam.

By lowering the deflection roller in this way relative to the traction sheave, an angle of wrap with which the support means wraps around the traction sheave can be increased.

According to one embodiment, the feet are arranged at the ends of the beam.

According to one embodiment, the drive bracket comprises a drive plate for receiving the drive and a tower for supporting the drive plate. The drive plate is fastened to a first end of the tower, such as the top end thereof. The tower is fastened to the beam at a second end, for example a lower end.

The tower can be constructed, for example, from a plurality of plates or sheet metal parts which can be connected to one another by welding or some other suitable joining method.

According to one embodiment, the installation structure comprises a base plate and at least one installation support. In this case, the beam is fastened to the at least one installation support via at least one of the feet. The support leg supports the drive bracket on the base plate.

For example, one foot can be fastened to the installation support, and the other foot can be fastened to the base plate. It is also possible that both feet are fastened to the installation support. If the installation structure comprises two installation supports, then, for example, one foot can be fastened to one installation support, and the other foot can be fastened to the other installation support.

Embodiments of the invention will be described below with reference to the accompanying drawings; neither the drawings nor the description should be interpreted as limiting the invention.

The drawings are merely schematic and not to scale. Like reference signs denote like or equivalent features in the various drawings.

DETAILED DESCRIPTION

Figure 1:
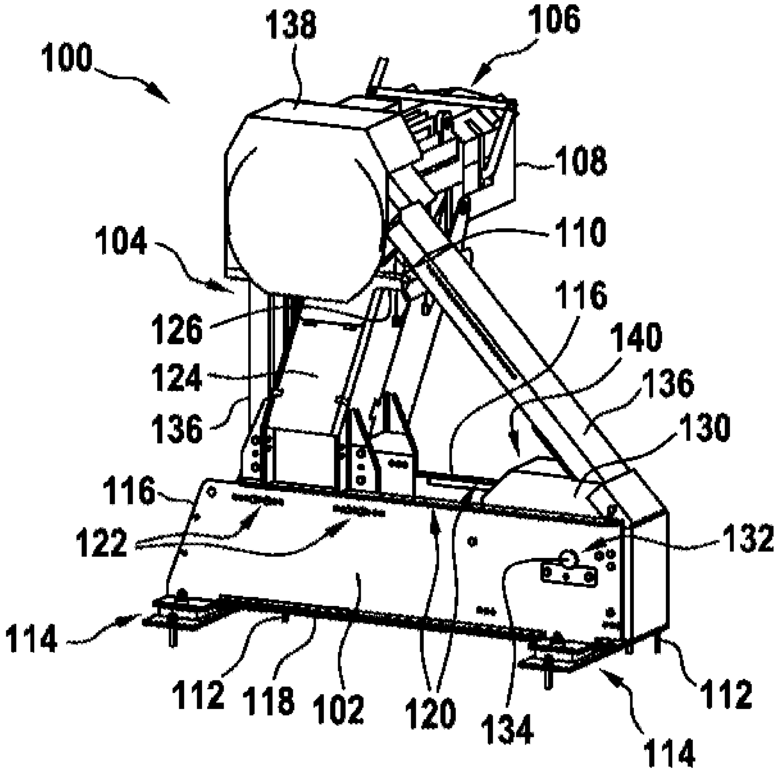
FIG. 1 is a perspective view of a fastening apparatus according to an embodiment of the invention.

FIG. 1 shows a fastening apparatus 100 for an elevator system. The fastening apparatus 100 comprises a beam 102 to which a drive bracket 104 is fastened. The drive bracket 104 supports a drive 106 which in this case comprises an electric motor 108 and a traction sheave 110 seated on the drive shaft thereof for driving a support means 112. The beam 102 is mounted so as to be slightly elevated on two feet 114. The feet 114 are fastened, for example screwed, to an installation structure of the elevator system, for example a base plate or an installation support in a machine room. Furthermore, the fastening apparatus 100 comprises a support leg 200, as can be seen in the side view in FIG. 2. The support leg 200 is fastened, for example screwed, at the upper end thereof to the drive bracket 104. With the free end thereof, the support leg 200 is supported on the installation structure. The support leg 200 thus serves to provide additional support for the drive bracket 104.

The support leg 200 can have a support foot 202 at the lower end thereof. The support foot 202 can be fastened, for example screwed, to the support leg 200 at a specific angle, in order to ensure that the support foot 202 rests flat on the installation structure. Alternatively or additionally, the support foot 202 can be screwed to the installation structure.

Bearing forces can be introduced into the beam 102 via the feet 114. The feet 114 can each be designed as a plate assembly. This is described in more detail below with reference to FIG. 4. The feet 114 are expediently arranged on an underside of the beam 102 facing the installation structure.

Figure 5:
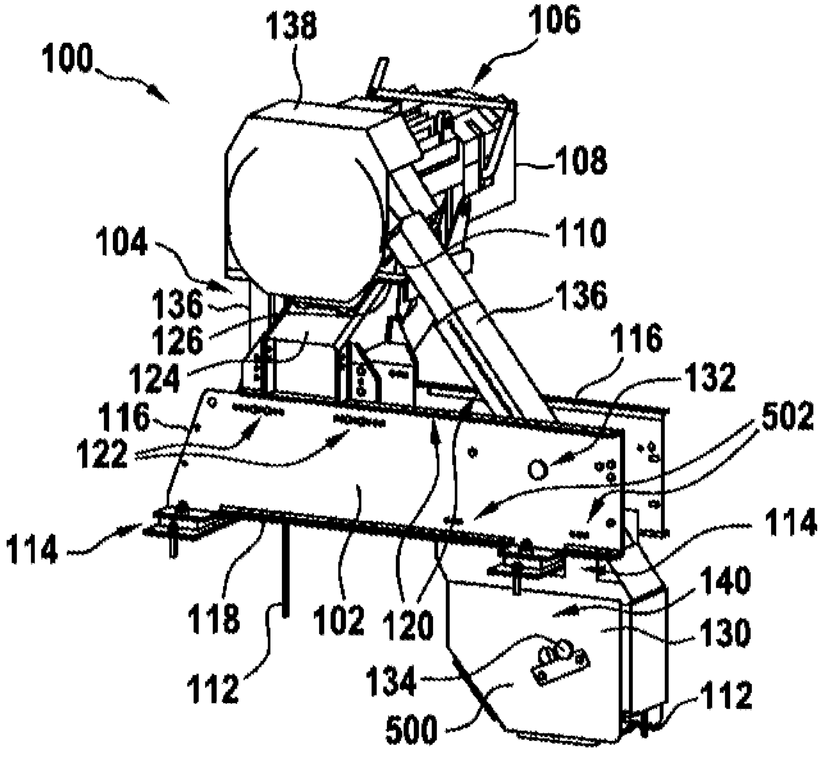
FIG. 5 is a perspective view of the fastening apparatus from FIG. 1 with a deflection roller installed in a suspended manner.
Figure 6:
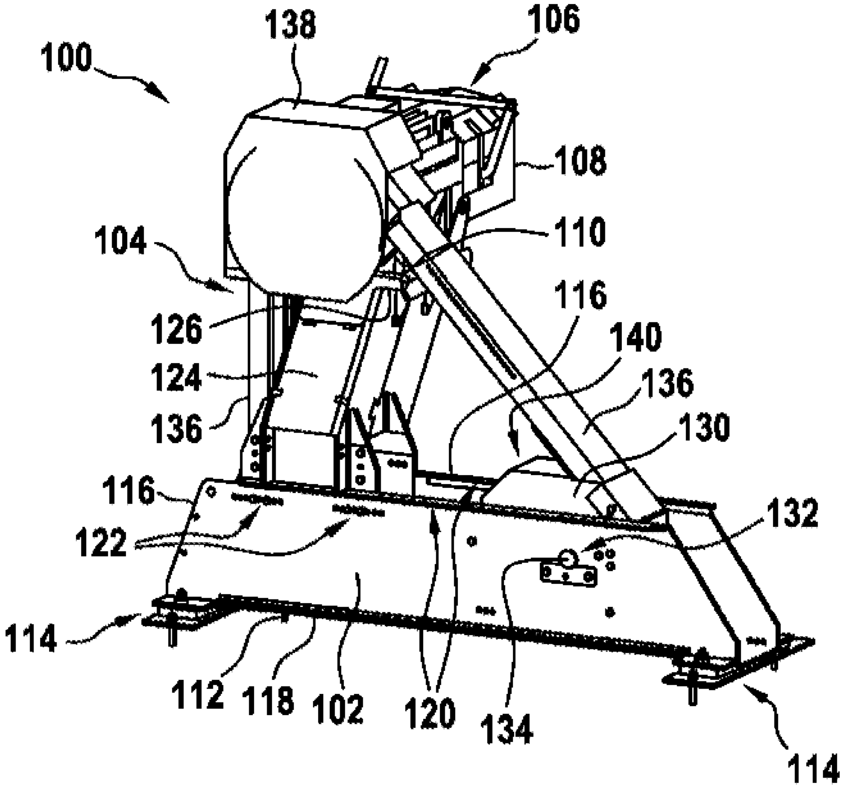
FIG. 6 is a perspective view of a fastening apparatus according to a further embodiment of the invention.
Figure 7:
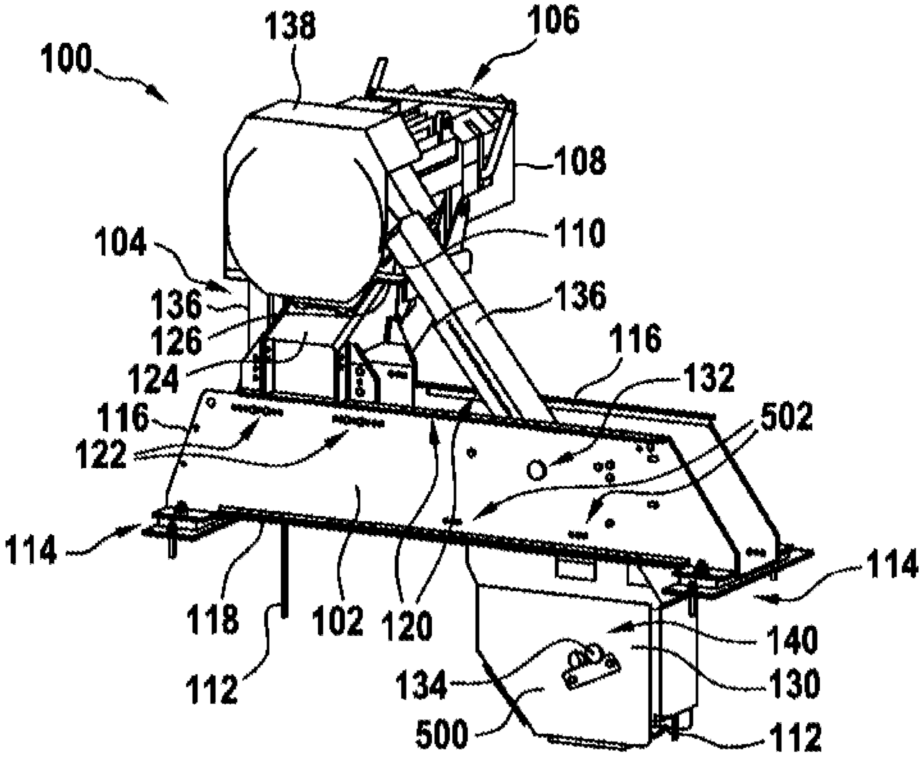
FIG. 7 is a perspective view of the fastening apparatus from FIG. 6 with a deflection roller installed in a suspended manner.

The feet 114 can be arranged at the outer ends of beam 102, as shown in FIGS. 6 and 7, for example. Alternatively, one of the feet 114 can be slightly inwardly offset, as shown in FIGS. 1 and 5, for example.

The beam 102 can be constructed from two parallel support plates 116 which are connected to one another on their underside via a one-part or multi-part connecting plate 118 to form a rigid support structure. For example, the connecting plate 118 can be welded to each of the support plates 116. The connecting plate 118 can also be part of the feet 114.

The two support plates 116 can be positioned at a specific distance from one another transversely to a longitudinal direction of the beam 102. The drive bracket 104 can be seated on two parallel longitudinal edges 120 of the support plates 116 and can be displaced along the longitudinal edges 120 in the longitudinal direction of the beam 102. A portion of the drive bracket 104 can be located between the two support plates 116 and can be screwed to each of the two support plates 116.

The longitudinal edges 120 can be formed, for example, by an outer edge of the support plates 116, which is bent over at right angles.

In addition, each of the support plates 116 can have a plurality of bores 122 for screwing the drive bracket 104 in different positions in the longitudinal direction of the beam 102.

As shown in FIG. 1, the drive bracket 104 can include a tower 124 of a defined height and a drive plate 126. The tower 124 can be screwed to the two support plates 116 at the lower end thereof. The drive plate 126 is placed on an upper end of the tower 124. The drive plate 126 supports the drive 106. The electric motor 108 can, for example, be arranged lying on the drive plate 126 and screwed thereto via a suitable motor receptacle 128.

For example, the drive plate 126 can be welded to the tower 124.

Similar to the beam 102, the tower 124 can be constructed from a plurality of individual parts in the form of plates or sheet metal parts. The individual parts can be connected to one another, for example by welding, to form a stable box-shaped profile.

In addition, the fastening apparatus 100 can comprise a deflection roller 130 for deflecting the support means 112. The deflection roller 130 can be arranged rotatably between the two support plates 116. For this purpose, the two support plates 116 can each have a corresponding axle receptacle 132, for example in the form of a bore, which serves to support an axle 134 of the deflection roller 130.

The axle receptacles 132 can each be arranged above a foot 114, in particular above the foot 114 which is inwardly offset.

The traction sheave 110 can be positioned at a specific vertical and horizontal distance from the deflection roller 130 by means of the drive bracket 104. Furthermore, the drive 106 is positioned offset to the beam 102 by means of the drive bracket 104 in such a way that the traction sheave 110 and the deflection roller 130 rotate in a common plane.

For safety reasons, the support means 112 can be at least partially surrounded by a channel 136. The traction sheave 110 can also be at least partially surrounded by a traction sheave housing 138. The deflection roller 130 can also be at least partially surrounded by a deflection roller housing 140.

Figure 3:
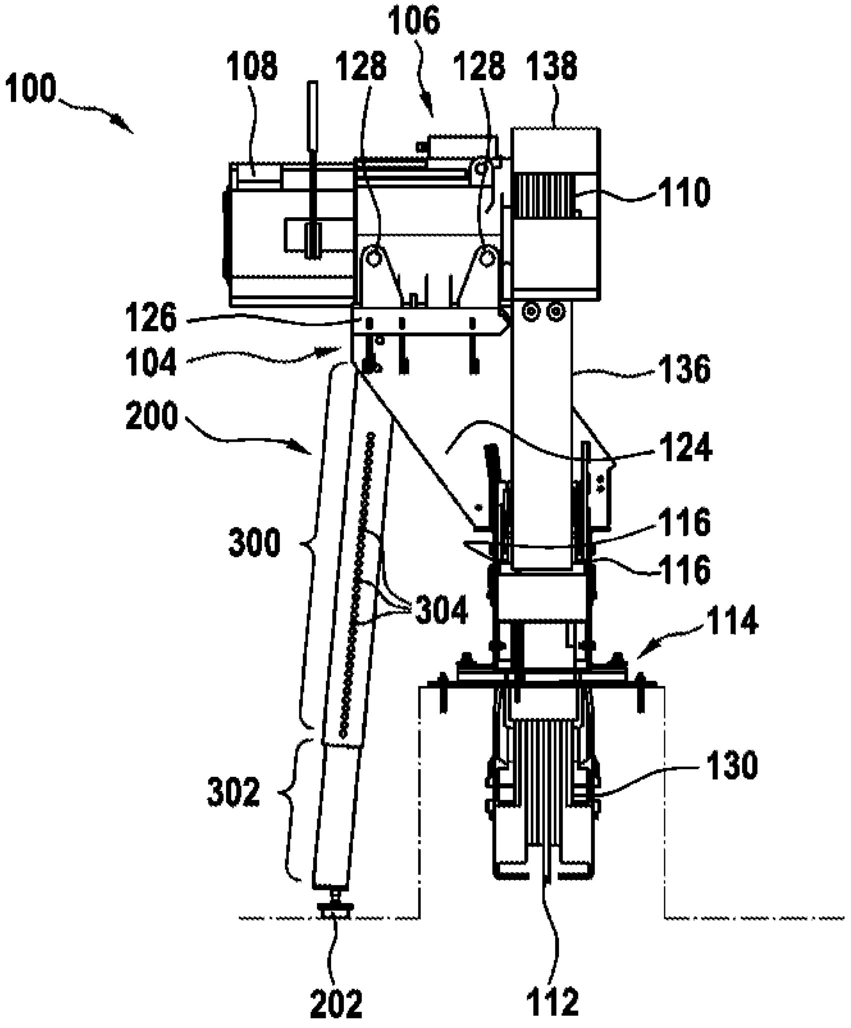
FIG. 3 is in a side view of the fastening apparatus from FIG. 1 with a length-adjustable support leg.

FIG. 3 shows the support leg 200 in a length-adjustable variant having an outer part 300 and an extendable inner part 302 which is arranged in the outer part 300 so as to be displaceable. The outer part 300 can have a plurality of latching openings 304 in the longitudinal direction thereof, which are used to latch the two tubes 300, 302, for example by screwing.

In contrast to FIGS. 1 and 2, the deflection roller 130 is installed in a suspended manner on the support plates 116 in this case, as will be described in more detail below with reference to FIG. 5.

Figure 2:
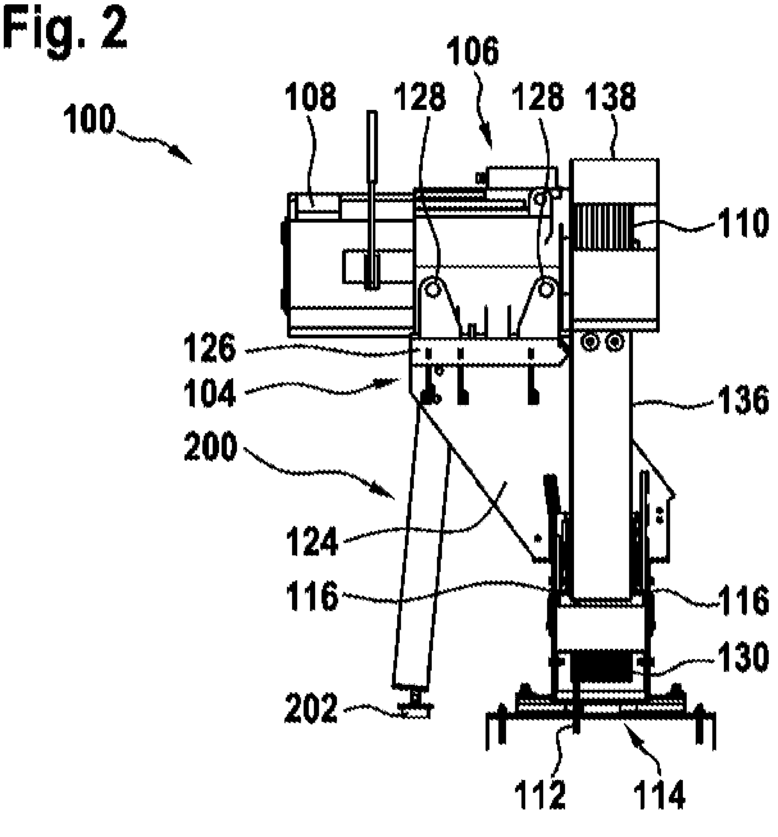
FIG. 2 is a side view of the fastening apparatus from FIG. 1.
Figure 4:
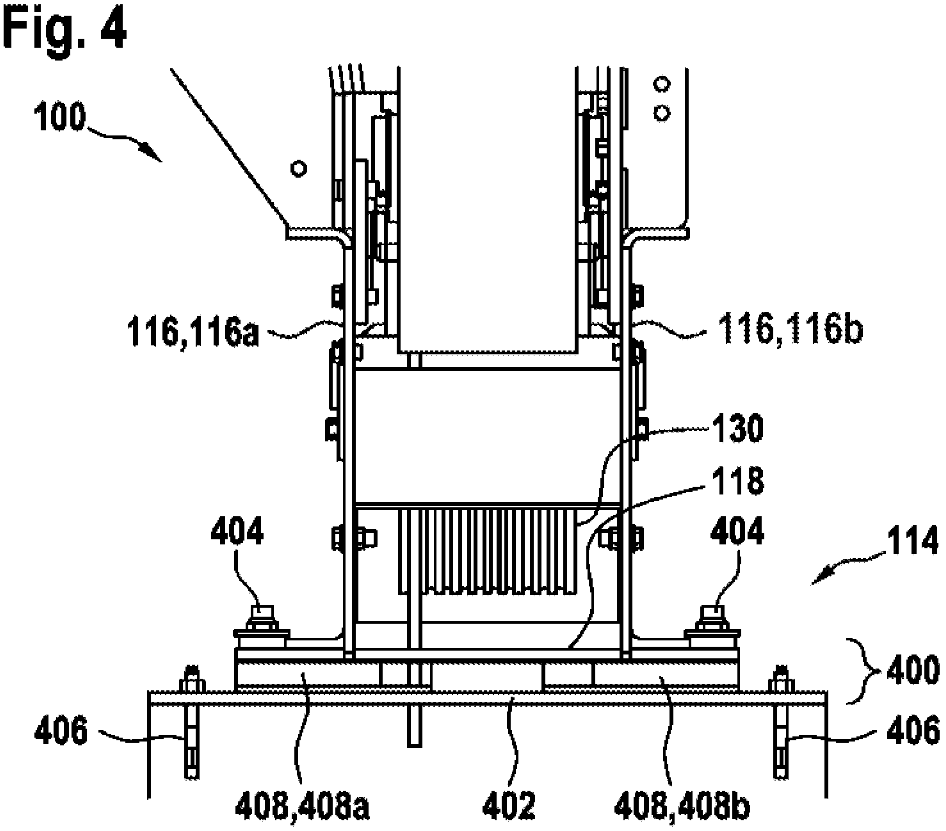
FIG. 4 is an enlarged representation of a portion of the fastening apparatus from FIG. 2.

FIG. 4 shows an enlarged representation of a foot 114 from FIGS. 1 to 3. The foot 114 is designed in the form of a plate assembly 400 made up of the connecting plate 118 and a fastening plate 402.

The connecting plate 118 can protrude beyond the support plates 116 on both sides, at least in the region of the foot 114, i.e., be significantly wider than a distance between the two support plates 116 in the transverse direction of the beam 102.

The fastening plate 402 can in turn be significantly wider than the connecting plate 118 and thus protrude beyond the connecting plate 118 on both sides.

The connecting plate 118 can be screwed to the fastening plate 402 by means of two connecting screws 404, for example. The fastening plate 402 can be screwed to the installation structure by means of two fastening screws 406, for example.

In order to increase the height of the plate assembly 400 without increasing the thickness of the fastening plate 402 and/or the connecting plate 118, the plate assembly 400 can additionally comprise an intermediate element 408 which is arranged between the fastening plate 402 and the connecting plate 118.

For example, the plate assembly 400 can have a left intermediate element 408*a* and a right intermediate element 408*b*, which elements can be arranged next to one another. The left intermediate element 408*a* can be placed opposite a left support plate 116*a*. The right intermediate element 408*b* can be placed opposite a right support plate 116*b*.

FIG. 5 shows a fastening apparatus 100 similar to that of FIG. 1, with the difference that the deflection roller 130 is installed in a suspended manner from the beam 102 in this case, as was already shown in FIG. 3. This results in a larger angle of wrap on the traction sheave 110.

The deflection roller 130 can be rotatably mounted in a deflection roller bracket 500. The support plates 116 can each have an installation portion 502 on which the deflection roller bracket 500 is fastened, for example screwed, on both sides of the two support plates 116.

In addition, the tower 124 is designed to be significantly shorter in this case than in FIGS. 1 and 2.

FIG. 6 shows a fastening apparatus 100 having a long tower 124 (as in FIGS. 1 and 2). In contrast to FIG. 1, the feet 114 are arranged at the outer ends of the beam 102 in this case. Similar to FIG. 1, the deflection roller 130 is rotatably mounted between the two support plates 116.

FIG. 7 shows a fastening apparatus 100 having a short tower 124 (as in FIG. 5) and a deflection roller bracket 500 installed in a suspended manner (as in FIGS. 3 and 5). As in FIG. 6, the feet 114 are arranged at the outer ends of the beam 102.

Figure 8:
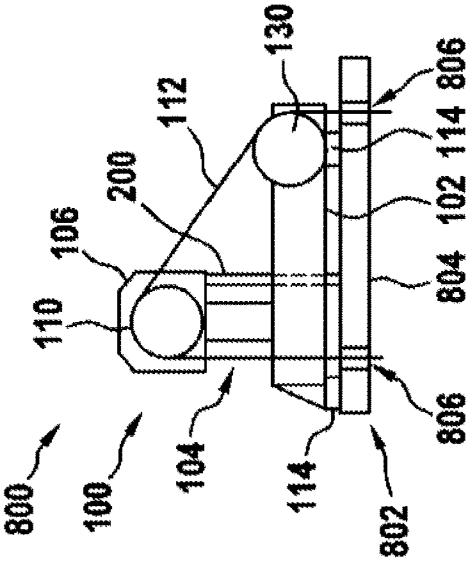
FIG. 8 is a simplified representation of the fastening apparatus from FIG. 1, the beam of which is fastened to a base plate.

FIG. 8 shows an elevator system 800 having the drive 106 and an installation structure 802 for installing the drive 106, for example in a machine room. The drive 106 is fastened to the installation structure 802 by means of the fastening apparatus 100 as shown in FIG. 1.

The installation structure 802 comprises a base plate 804 having two openings 806 through which the support means 112 can be passed. The fastening apparatus 100 is fastened to the base plate 804 with both feet 114. The support leg 200 is supported on the base plate 804 (for clarity only, the support leg 200 is not shown in FIGS. 9 to 15).

The drive 106 can be arranged, for example, directly above or below an elevator shaft or offset to the side in the machine room. Depending on the arrangement of the drive 106, the support means 112 can be deflected between the drive 106 and the elevator shaft by one or more deflection rollers 130.

Figure 9:
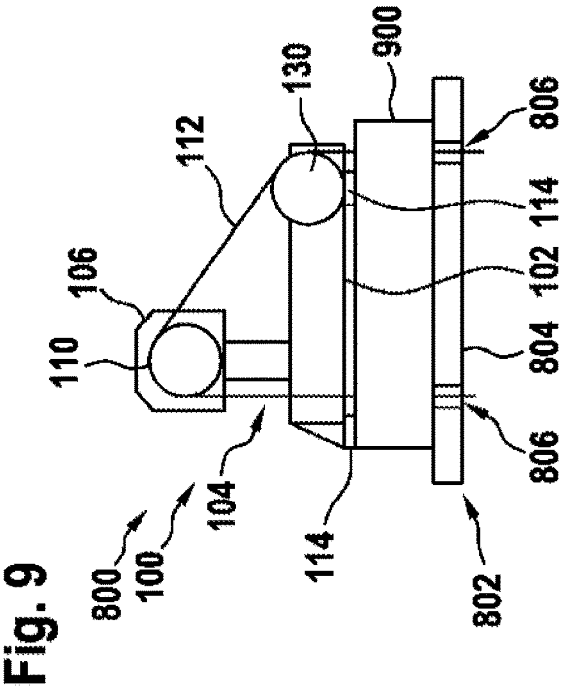
FIG. 9 is a simplified representation of the fastening apparatus from FIG. 1, the beam of which is fastened to an installation support.

In FIG. 9, the installation structure 802 comprises, in addition to the base plate 804, an installation support 900 which is arranged on the base plate 804. The fastening apparatus 100 rests with both feet 114 on the installation support 900.

Figure 10:
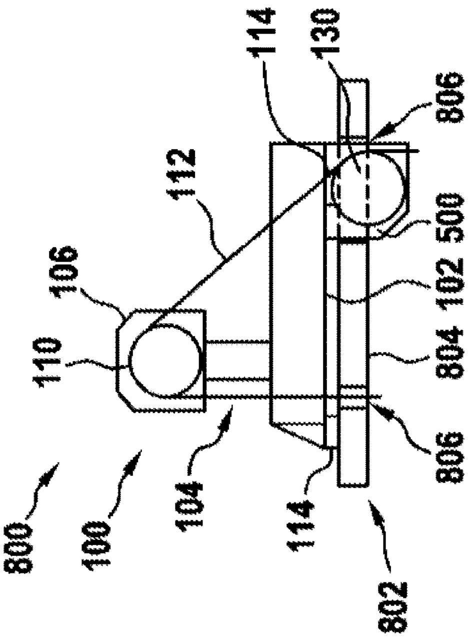
FIG. 10 is a simplified representation of the fastening apparatus from FIG. 5, the beam of which is fastened to a base plate.
Figure 11:
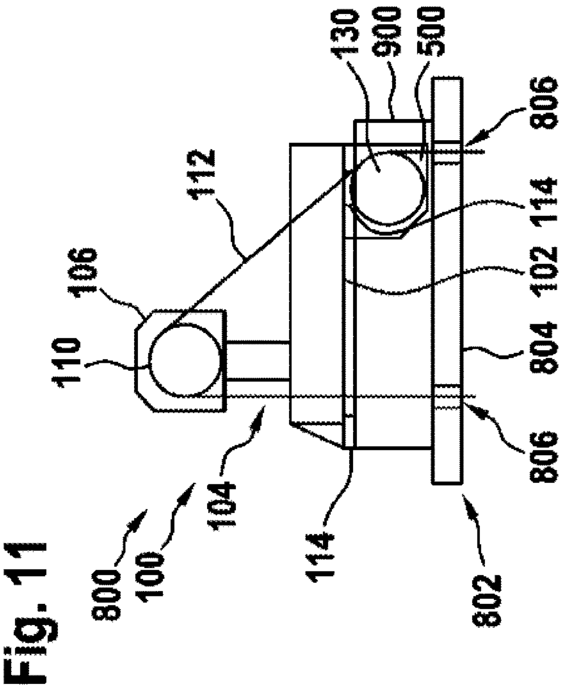
FIG. 11 is a simplified representation of the fastening apparatus from FIG. 5, the beam of which is fastened to an installation support.

FIG. 10 shows the elevator system 800 with the fastening apparatus 100 from FIG. 5. The fastening apparatus 100 is fastened to the base plate 804 with both feet 114 in a manner similar to that in FIG. 8. The deflection roller bracket 500 is countersunk into the base plate 804. In contrast, in FIG. 11 the fastening apparatus 100 is fastened to the installation support 900 with both feet 114.

Figure 12:
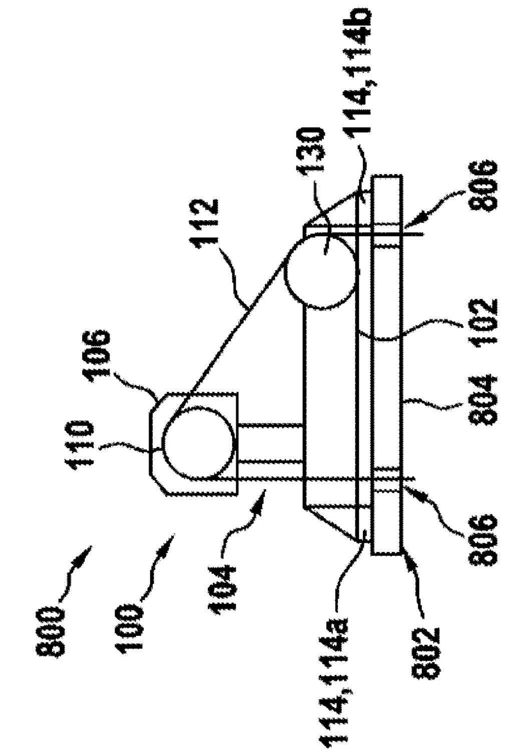
FIG. 12 is a simplified representation of the fastening apparatus from FIG. 6, the beam of which is fastened to a base plate.

FIG. 12 shows the elevator system 800 having the fastening apparatus 100 from FIG. 6. The fastening apparatus 100 is fastened to the base plate 804 with both feet 114, with the two openings 806 of the base plate 804 being arranged between the feet 114.

Figure 13:
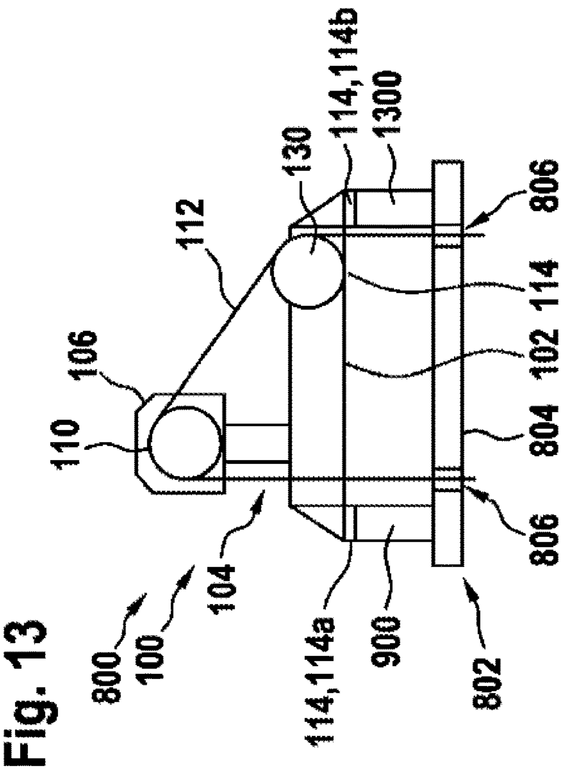
FIG. 13 is a simplified representation of the fastening apparatus from FIG. 6, the beam of which is fastened to two installation supports.

In FIG. 13, the installation structure 802 comprises a further installation support 1300 in addition to the base plate 804 and the installation support 900. The two installation supports 900, 1300 are arranged parallel to one another at a specific distance on the base plate 804. The fastening apparatus 100 rests with a left foot 114*a* on the installation support 900 and with a right foot 114*b* on the further installation support 1300.

Figure 14:
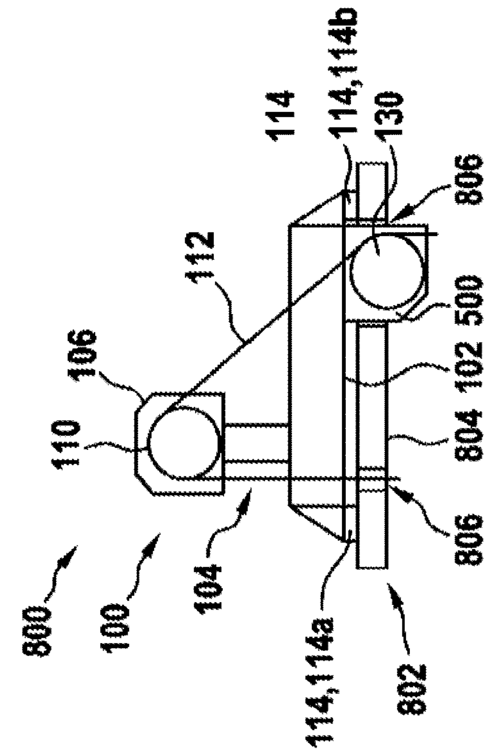
FIG. 14 is a simplified representation of the fastening apparatus from FIG. 7, the beam of which is fastened to a base plate.

FIG. 14 shows the elevator system 800 having the fastening apparatus 100 from FIG. 7. Similar to FIG. 10, the fastening apparatus 100 is fastened to the base plate 804 with both feet 114, the deflection roller bracket 500 being countersunk into the base plate 804.

Figure 15:
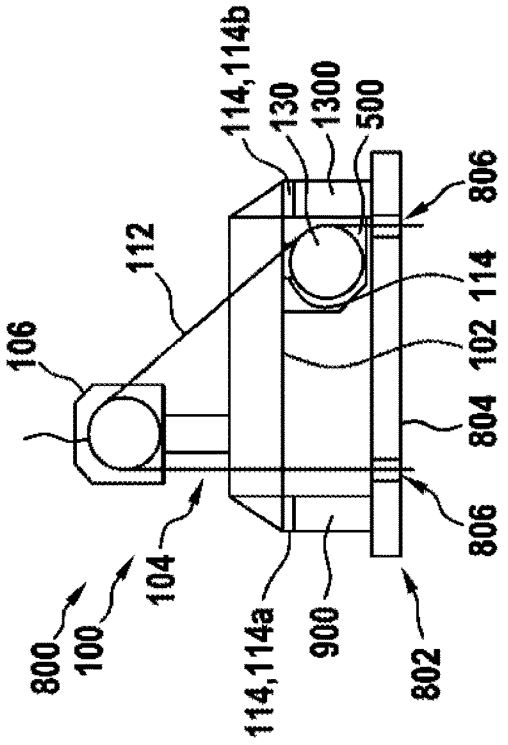
FIG. 15 is a simplified representation of the fastening apparatus from FIG. 7, the beam of which is fastened to two installation supports.

In FIG. 15, the fastening apparatus 100 is installed on the two installation supports 900, 1300 in a manner similar to that in FIG. 13. The deflection roller bracket 500 hangs over the base plate 804.

Finally, it should be noted that terms such as "comprising," "including," etc. do not exclude other elements or steps, and terms such as "a" or "an" do not exclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A fastening apparatus for fastening a drive of an elevator system, wherein the elevator system includes an installation structure for installing the drive, the fastening apparatus comprising:

a beam having two feet adapted to fasten the beam to the installation structure;

a drive bracket adapted to receive the drive, wherein the drive bracket is fastened to the beam;

a support leg having one end fastened to the drive bracket and being adapted to support the drive bracket on the installation structure; and wherein the support leg includes at least two elements that are displaceable relative to one another and that can be displaced telescopically into one another for selectively adjusting a length of the support leg, and wherein the at least two elements can be latched together to fix the selected length of the support leg.

2. The fastening apparatus according to claim 1 wherein the support leg has a support foot at another end and the support foot rests flat on the installation structure when the fastening apparatus is installed on the installation structure.

3. The fastening apparatus according to claim 1 wherein the beam has two parallel support plates connected to one another by at least one connecting plate, the feet are fastened to the at least one connecting plate, and the drive bracket is fastened to the support plates.

4. The fastening apparatus according to claim 3 wherein each of the feet is formed by a plate assembly made up of the at least one connecting plate and a fastening plate adapted to fasten the beam to the installation structure.

5. The fastening apparatus according to claim 4 wherein the fastening plate is wider than the at least one connecting plate and protrudes beyond the at least one connecting plate on opposite sides of the fastening plate.

6. The fastening apparatus according to claim 4 wherein the plate assembly includes at least one intermediate element, the at least one intermediate element being arranged between the fastening plate and the at least one connecting plate, and the at least one connecting plate rests on the at least one intermediate element.

7. The fastening apparatus according to claim 4 wherein the plate assembly includes a first intermediate element and a second intermediate element, the first intermediate element and the second intermediate element being arranged next to one another between the fastening plate and the at least one connecting plate and the at least one connecting plate rests on the first intermediate element and on the second intermediate element.

8. The fastening apparatus according to claim 4 wherein the support plates each have an axle receptacle formed therein, the axle receptacles adapted to receive an axle of a deflection roller.

9. The fastening apparatus to claim 4 wherein the support plates each have an installation portion at which a deflection roller bracket is fastened and suspended.

10. The fastening apparatus according to claim 1 wherein the feet are arranged at opposite ends of the beam.

11. The fastening apparatus according to claim 1 wherein the drive bracket includes a drive plate adapted to receive the drive and a tower supporting the drive plate, the drive plate being fastened to a first end of the tower and a second end of the tower being fastened to the beam.

12. An elevator system comprising:

a drive;

an installation structure for installing the drive in the elevator system; and the fastening apparatus according to claim 1 wherein the drive is fastened to the installation structure by the fastening apparatus.

13. The elevator system according to claim 12 wherein the installation structure includes a base plate and at least one installation support, the beam of the fastening apparatus is fastened to the at least one installation support by at least one of the feet of the fastening apparatus and the support leg supports the drive bracket on the base plate.

* * * * *